Patented Apr. 23, 1929.

1,710,556

UNITED STATES PATENT OFFICE.

CONWAY VON GIRSEWALD, OF FRANKFORT-ON-THE-MAIN, GERMANY.

METHOD FOR CONVERTING SILICATES CONTAINING LITHIA WITH NEUTRAL ALKALI METAL SALTS.

No Drawing. Application filed April 14, 1927, Serial No. 183,913, and in Germany April 22, 1926.

This invention relates to a method of making water soluble lithium salts by conversion of insoluble silicates containing lithia by heating with neutral alkali-metal salts.

It is known, that an exchange of the bases takes place, when lithia containing ores are heated with neutral alkali-metal salts. The alkali-metal salts are then converted into an insoluble compound, whereas the lithia is converted into a water soluble salt. From lithia mica and potassium chloride it was thus for example obtained a potassium mica free from lithium and lithium chloride. But in order to obtain an approximately quantitative conversion according to the known methods it was necessary to use a very great excess of alkali-metal salts as for example 2/3 or one part of potassium sulfate for one part of ore, which as a rule do not contain more than 1–2% of lithia. It is true, that the alkali-metal salts used in excess may be recovered. But this recovery uses up much work and energy, required for evaporation, crystallization, centrifugalization, drying and disintegration. The conversion temperature in the known methods was supposed to be far below the fusion point.

It has now been found, that the above described chemical reaction between lithia containing silicates and alkali-metal salts is in a high degree dependent upon the keeping of certain temperature range. When carrying out the reaction below the necessary temperature range the conversion is very incomplete, whereas at temperatures above the necessary temperature range an inversion of the reaction takes place, the lithia compound thus becoming insoluble again.

It is evident, that the narrow temperature ranges, necessary according to the invention, cannot be maintained, when heating large amounts of a material having such a poor heat conductivity as for example mica, in an ordinary furnace. If however according to the invention an automatic furnace such as for example a rotary tubular roasting furnace or a Dwight-Lloyd furnace is used for the execution of the reaction, it is not difficult to maintain the most favorable temperature by simple regulation, thereby obtaining a quantitative conversion of the lithia compounds.

The advantage of using mechanical furnaces for the execution of the above reaction at constant temperatures is to be seen in the fact that only a part of the formerly used amount of alkali-metal salt for the conversion of the ore is required. Where heretofore for one part of ore were used two thirds to one part of alkali-metal sulfate, the new method may be carried through with an addition of about one third part of alkali-metal sulfate with respect to the ore. The cost for the recovery of the alkali-metal salt is thereby decreased. Furthermore the formerly used excess of alkali-metal salts and the local superheating taking place in an ordinary furnace led to the formation of lumps of the material which partially sintered, thereby forming a mass which had to be ground before leaching it out. This operation is also avoided when working according to the method of the invention.

The temperatures most favorable for the reaction above described vary between 600 and 950° C. They depend upon the nature of the ore and the alkali-metal salt used. Thus for example when using lepidolith, containing 1,44% lithia and potassium sulfate the most favorable temperature was found to be between 880 and 920° C., whereas with potassium chloride it was between 720 and 750° C.

I claim:

1. A process which comprises heating a lithia-containing silicate with a neutral alkali metal salt at a temperature between 600 and 950° C.

2. A process which comprises heating a lithia-containing silicate with a neutral alkali metal salt at a temperature between 600 and 950° C. in a tubular revolving furnace.

3. A process which comprises heating a lithia-containing silicate with a neutral alkali metal salt at a temperature of approximately 900° C.

4. A process which comprises heating a lithia-containing silicate with a neutral alkali metal salt at a temperature of approximately 900° C. in a tubular revolving furnace.

5. A process which comprises heating a lithia-containing silicate with potassium sulfate at a temperature of from about 880 to 920° C.

6. A process which comprises heating a lithia-containing silicate with potassium sulfate at a temperature of from about 880 to 920° C. in a tubular revolving furnace.

In testimony whereof I affix my signature.

DR. CONWAY VON GIRSEWALD.